United States Patent [19]

Chanal et al.

[11] Patent Number: 4,516,601
[45] Date of Patent: May 14, 1985

[54] MINING CYLINDER HYDRAULIC SLIDE VALVE

[75] Inventors: Roger Chanal, Saint Etienne; Daniel Cotte, Chambon Feugerolles, both of France

[73] Assignee: Bennes Marrel, France

[21] Appl. No.: 393,977

[22] Filed: Jun. 30, 1982

[51] Int. Cl.³ .................... F16K 17/04; F16K 31/122
[52] U.S. Cl. ................. 137/510; 137/DIG. 7
[58] Field of Search ............... 137/510, DIG. 7, 859; 92/102

[56] References Cited

U.S. PATENT DOCUMENTS

| 1,871,535 | 8/1932 | Lattner | 137/510 |
| 2,585,575 | 2/1952 | Nedergaard | 137/510 X |
| 2,587,728 | 3/1952 | Hoskins | 137/DIG. 7 X |
| 2,899,973 | 8/1959 | Carlson | 137/859 |
| 3,913,613 | 10/1975 | Kostjunin et al. | 137/DIG. 7 X |

Primary Examiner—Martin P. Schwadron
Assistant Examiner—John S. Starsiak, Jr.
Attorney, Agent, or Firm—Remy J. VanOphem

[57] ABSTRACT

A slide valve especially designed for mining prop cylinders. The slide valve is durable and can be easily checked and adjusted. An inlet pressure line is separated from an outlet line by a diaphragm pressed against its seat by a spring. A thrust washer allows the diaphragm to remain flat, even when it is subjected to the pressure of the spring.

10 Claims, 8 Drawing Figures

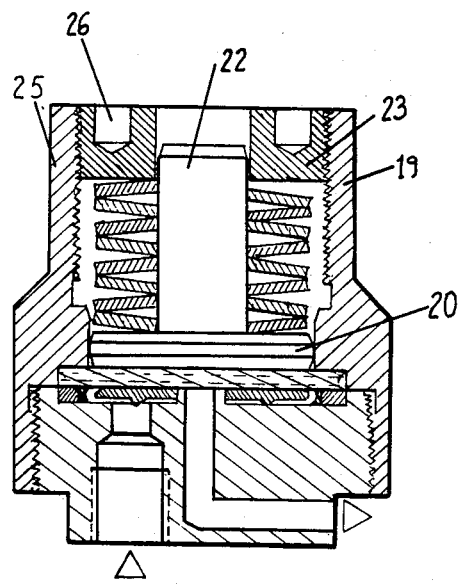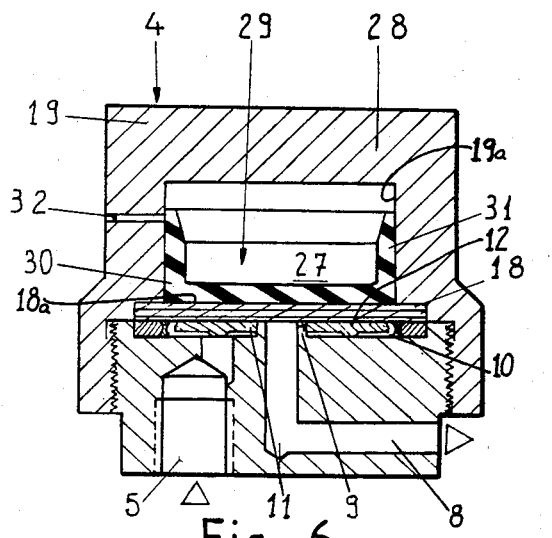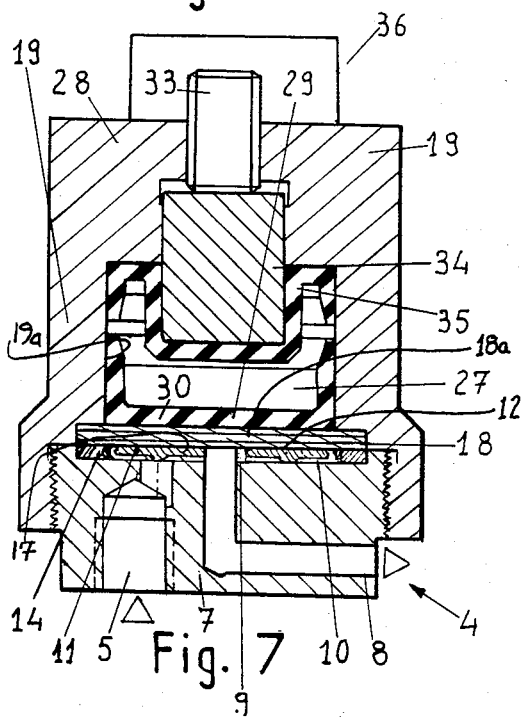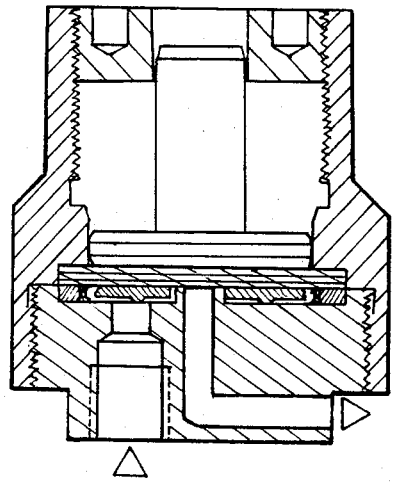
Fig. 5
Fig. 6
Fig. 7
Fig. 8

MINING CYLINDER HYDRAULIC SLIDE VALVE

BACKGROUND OF THE INVENTION

1. Field of the Invention

The present invention pertains to hydraulic slide valves of the type used for reinforcing props in mines.

2. Description of the Prior Art

The reinforcing pilings used in mines include push-cylinders which are squeezed between the top bed and the stope or gallery walls. While the push-cylinders apply a considerable thrust (usually 90 or 100 tons each), they must sustain the pressure applied by the adjacent beds. Since the latter pressure may increase and reach a virtually unlimited value, it is necessary to equip the hydraulic system of the reinforcing cylinders with a pressure regulating valve, also called a slide valve.

In order to operate satisfactorily, the slide valve should perform two functions. First, the slide valve should open to allow for an outflow of fluid as soon as pressure rises above a preset level. The valve should open immediately at the preset level in order to permit a flow of liquid, which may become significant, and avoid irreversible damage to the piling including that which may occur when the adjacent beds suddenly dry out following what is known as a "top bed blow". Secondly, the slide valve should close immediately when the liquid pressure falls below a preset level, so as not to impair the prop as a means of reinforcement.

The slide valves that are presently used offer three major disadvantages. Some of these lack durability. Others include wear components whose condition cannot be checked from outside and deprive the prop of a safety device which would prevent irreversible damage caused by the eventual motion of the adjacent beds. Finally, other types of valves close as the pressure reaches a preset level, which is already too low with respect to the pressure which controls their opening.

SUMMARY OF THE INVENTION

The present invention eliminates these disadvantages by providing a valve which operates efficiently without incurring noticeable wear through an intensive and continuous use at high pressure regardless of the flow variations. Furthermore, the slide valve operates satisfactorily regardless of the type of hydraulic system and fluid used. The slide valve is, therefore, highly desirable for mine reinforcing equipment, as well as for any other equipment with which it may be used.

The slide valve according to the invention is designed to be mounted in parallel on a hydraulic system. It includes a body encompassing an inlet pressure line and an outlet line. A spring returned seal is provided to prevent any exchange between the inlet and outlet lines during the normal operation of the system, and to allow an exchange as soon as the pressure exceeds a preset level in the inlet line. The slide valve is characterized by the fact that the inlet pressure line opens onto a flat surface from which an embossment protrudes. The embossment forms a seat in the center of which the outlet line opens. The seal consists of a flexible diaphragm which rests under the pressure applied by a spring, against the top of the embossment which constitutes the sealing seat. A flat thrust washer, provided around the embossment, remains in contact with the top of the embossment so as to provide a flat thrust surface for the diaphragm when it moves to a closing position under the action of the spring.

According to one object of the invention, when any pressure is applied by the spring, the entire surface of the diaphragm comes to rest against a flat fixed surface. This enhances the diaphragm's shape retention capability, as well as its durability.

According to another object of the invention, push devices are provided between the diaphragm and the return spring to apply pressure to the upper surface of the diaphragm.

According to another object of the invention, the push devices encompass a sliding piston with a flat thrust surface which comes to rest against the diaphragm, thus protecting the diaphragm against deformation as the pressure applied from the inlet line exceeds that of the spring.

According to another object of the invention, the push devices encompass a flexible cap, made of a resilient material, which acts as a seal inside a recess provided in the rigid valve body when compressed gas is used instead of a return spring.

According to another object of the invention, the perimeter of the diaphragm is squeezed between the rigid valve body, an envelope of the valve, and a composite washer, such that the thrust washer remains free within its annular recess.

According to another object of the invention, the surface of the thrust washer which comes into contact with the rigid bottom of the valve body includes at least one embossment which allows the surface of the thrust washer to rest against the valve body without necessarily constituting a seal.

According to another object of the invention, the tightness of the diaphragm, between the valve body and the envelope of the valve, is provided by a composite washer having two concentric rings which are rigidly mounted together. The rings include an outside metallic ring and an inside ring made of a resilient material, such as rubber, which form sealing lips.

According to another object of the invention, the spring return means which operate behind the diaphragm's piston include a pressure gas cushion. The rear part of the recess which houses the gas cushion includes a flexible seal which abuts an adjustment piston and remains in contact with a push-screw whose control end extends beyond the envelope of the valve.

According to still another object of the invention, the push-screw is topped by a safety cap, sealed on the top of the envelope after the adjustment.

The slide valve assembly of the present invention is a solid component which may be affixed to the body of a mine prop, and which may easily be removed in order to be adjusted or repaired. The push-screw also permits adjustment of the valve remote from the mine and, therefore, no further adjustment is required on site.

The attached drawings will give a better understanding of the invention.

BRIEF DESCRIPTION OF THE DRAWINGS

FIG. 5 is a cross-sectional view of a second embodiment of the device of the present invention equipped with stacked spring washers;

FIG. 6 is a cross-sectional view of a third embodiment of the valve of the present invention equipped with a pressure gas cushion illustrating the return means thereof;

FIG. 7 is a cross-sectional view of a fourth embodiment of the valve of the present invention equipped with pressure regulating means for the gas cushion; and FIG. 8 illustrates the closed position of the valve shown in FIGS. 4 and 5.

DETAILED DESCRIPTION OF THE PREFERRED EMBODIMENT

Figure 1:
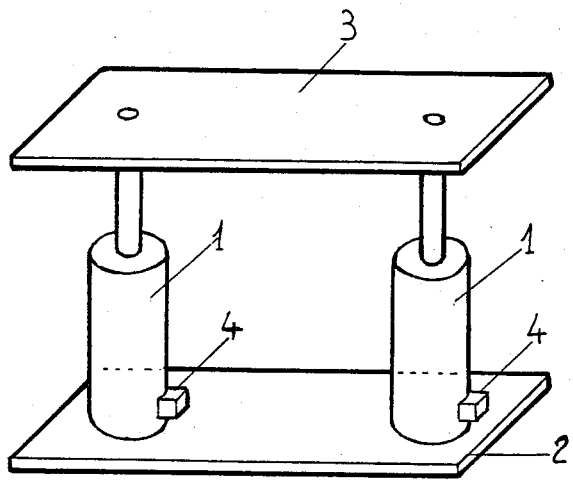
FIG. 1 illustrates a reinforcing piling equipped with slide valves provided in accordance with the present invention.

FIG. 1 illustrates a reinforcing hydraulic pile for use in mines. The pile includes two push-props which are respectively equipped with a high powered cylinder 1. Both cylinders are mounted between a base 2 resting against the floor and a cap 3 resting against the top bed.

Each cylinder 1 is equipped with a slide valve 4.

Figure 2:
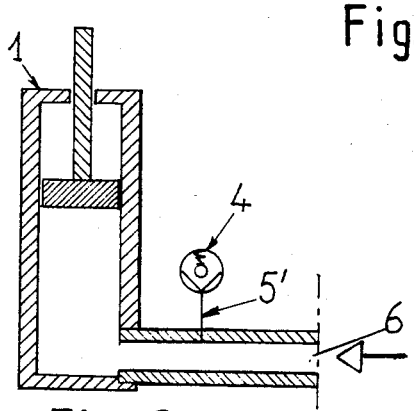
FIG. 2 is a schematic hydraulic diagram illustrating the connection of a slide valve provided in accordance with the present invention.

FIG. 2 shows that, in some cases, the slide valve 4 is tap mounted, as shown at 5', in parallel onto the line 6 which feeds the pressure fluid to the cylinder 1. For safety, the slide valve 4 remains shut as long as the pressure in the line 6 and in the cylinder 1 does not exceed a preset value. However, as soon as the pressure exceeds the preset value, the slide valve 4 opens momentarily to let out a sufficient quantity of liquid to bring the pressure of the cylinder 1 to an acceptable level. As soon as this condition is achieved, the slide valve 4 shuts and the cylinder 1 continues to support the cap 3 of the pile.

Figure 3:
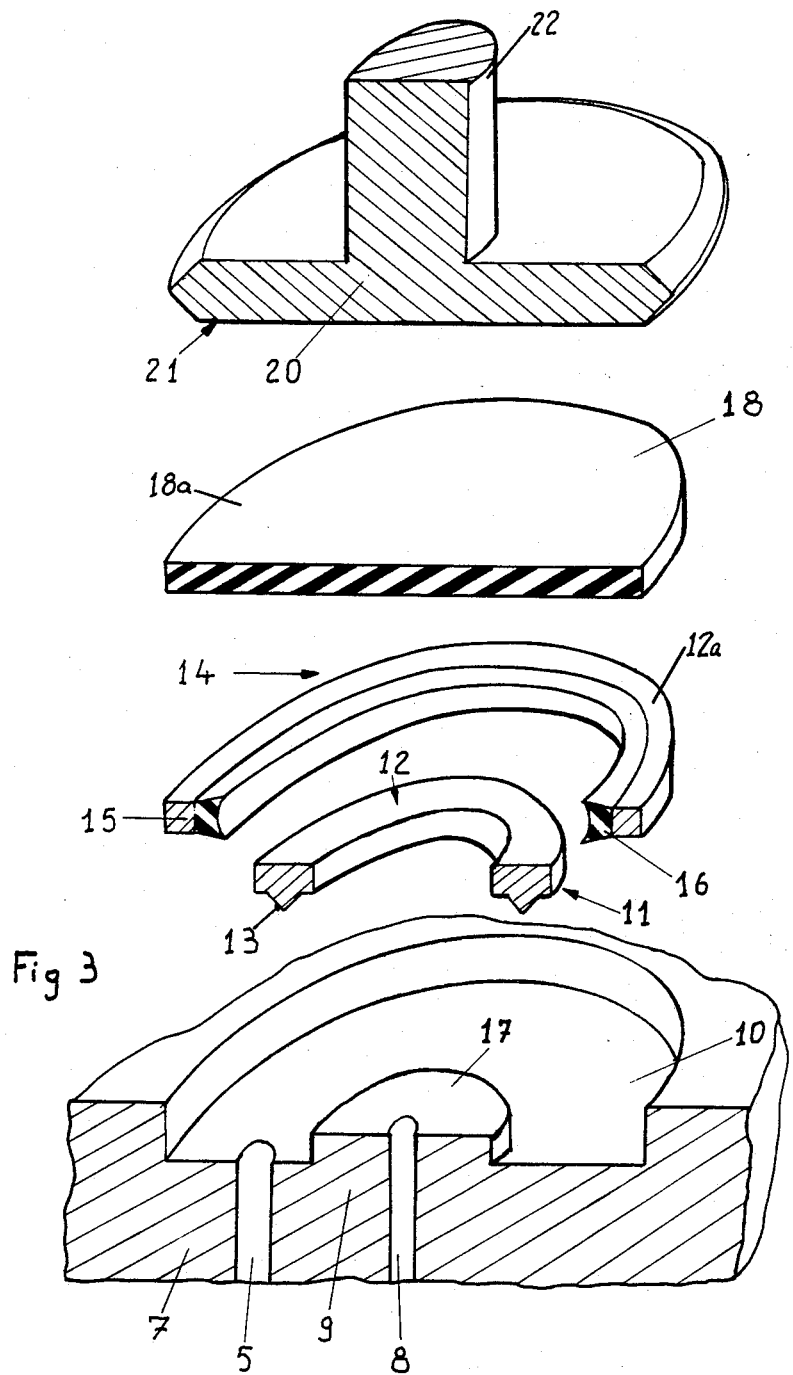
FIG. 3 is an exploded elevational view of some of the main components of a slide valve provided in accordance with the present invention.

FIGS. 3 and 8 illustrate various alternate embodiments of the slide valve 4.

In the embodiment illustrated in FIGS. 3, 4, 5 and 8, the slide valve 4 includes a rigid annular valve body 7 having a central line or passage 8 designed for the drainage of the overflow, and a line or inlet passage 5 disposed off center for inlet of hydraulic pressure. The central line 8 opens at the center of an embossment or hub 9, having a flat upper circular face or seat 17, which protrudes an embossment hub height above the solid bottom of an annular recess 10 and terminates in the flat upper face or sealing surface 17. The pressure inlet line 5 opens in the solid bottom of the annular recess or chamber 10 surrounding the embossment 9.

The annular recess 10 houses two concentric rings. One ring is an annular thrust washer 11 whose upper face 12 is flat and smooth and whose bottom face has at least one U-shaped edge 13 which abuts the flat bottom of the annular recess 10. The other ring is an ordinary composite washer 14, commercially known as "BS WASHER", which has an outside metal ring 15 rigidly mounted to an internal ring 16. The internal ring 16 has inwardly extending sealing lips which are made of a resilient material such as rubber.

When the washers 11 and 14 are positioned inside an annular recess 10, their upper faces 12 and 12a are in the same plane as the annular seating surface or upper circular face 17 of the embossment 9. A sealing diaphragm 18, made of a resilient material such as rubber, is laid over the faces 12, 12a and 17. An upper or rear face 18a of the diaphragm 18 is seated and squeezed about its perimeter by a counterbored seat in a rigid envelope or valve housing 19 which is screwed onto the rigid annular valve body 7. The rigid envelope 19 houses a sliding piston 20 whose flat front face 21 comes to rest against the upper or rear face 18a of the sealing diaphragm 18. The sliding piston 20 has a central rod 22 which is encircled by spring return means, compressed between a bottom plug 23 which is threadably fixed in the rigid envelope 19 and the sliding piston 20.

Figure 4:
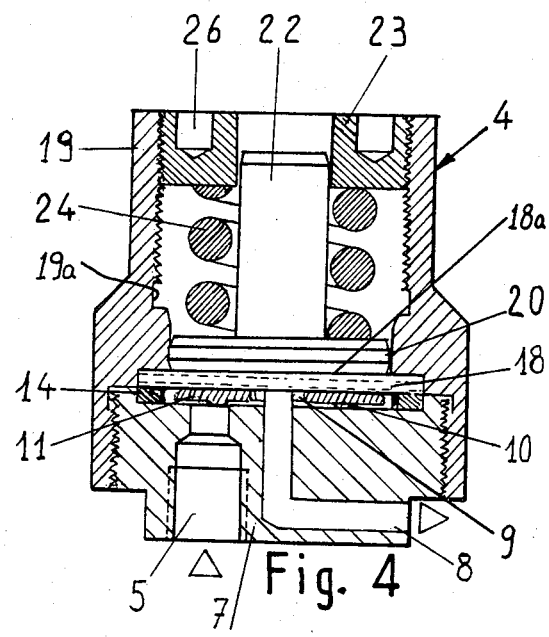
FIG. 4 is a cross-sectional view of one embodiment of a slide valve having a return spring.

In the embodiment illustrated in FIG. 4, the spring return means consists of a helical spring 24 compressed between the sliding piston 20 and the bottom plug 23.

In the embodiment illustrated in FIG. 5, the spring return means consists of a stack of metal spring washers 25, stacked in opposite directions in the shape of a truncated cone, which are threadably fixed in, and compressed between, the sliding piston 20 and the bottom plug 23 of the rigid envelope 19. The bottom or annular plug 23 is threaded onto the rear part of the rigid envelope 19 and includes control imprints or cavities 26. A lug wrench, not shown, is engaged into the control imprints 26 to thread the bottom plug 23 in or out so as to adjust the spring return means 24 or 25.

OPERATION

Following the selected adjustment, the spring return means 24 or 25 define a pressure limit below which the sliding piston 20 compresses the sealing diaphragm 18 against the upper circular face 17, in opposition to the pressure applied from the inlet line 5. As long as the pressure in the inlet line 5 remains below the preset level, the spring return means 24 or 25 apply their pressure against the sealing diaphragm 18 and prevent any exchange between the inlet line 5 and the outlet line 8.

It should be noted that throughout this shutting or seating phase, the sealing diaphragm 18 remains in contact with both the upper circular face 17 and the upper face 12 of the thrust washer 11, thus remaining flat regardless of the pressure applied by the spring return means 24 or 25 and regardless of the pressure applied from the inlet line 5 and the annular recess 10.

However, as soon as the pressure in the inlet line 5 exceeds the level set by the adjustment of the bottom plug 23, the sealing diaphragm 18 will be lifted upwardly to effect a backward or upward displacement of the sliding piston 20 against the spring return means 24 or 25.

Throughout the backward or upward displacement of the sliding piston 20, the contiguous surface of the diaphragm 18 rests against the flat front face 21 of the sliding piston 20.

Local bulging of the sealing diaphragm 18 is therefore avoided while the inlet and outlet lines 5 and 8 communicate freely. As the liquid flows through the outlet line 8, the pressure diminishes in the inlet line 5 and in the cylinder 1. As soom as the pressure has fallen below the preset level, the spring return means 24 or 25 apply their pressure and the sliding piston 20 compresses the diaphragm 18 against the upper circular face 17.

In the embodiment illustrated in FIG. 6, the spring return means consists of a pressure gas cushion 27. The gas cushion 27 is enclosed within the rigid envelope 19 which includes a solid tight bottom 28. In this case, the rear or upper face 18a of the sealing diaphragm 18 is in contact with a cup-shaped seal 29 made of a resilient material. The seal 29 includes a flat bottom 30 which rests against the upper or rear face 18a of the sealing diaphragm 18 and a cylindrical peripheral side or lip 31 which rests against the internal wall of a bore 19a which houses the seal 29, in the rigid envelope 19. A radial passage 32 is drilled through the wall of the rigid envelope 19 to provide a passage which enters the bore 19a behind or above the peripheral lip 31 of the seal 29.

The operation is similar to the one that was previously described. In the sealing or off position, the sealing diaphragm 18 rests against a uniformly flat surface defined by the upper or rear circular face 17 of the embossment 9 and by the flat face 12 of the thrust washer 11. However, as soon as the pressure in the inlet line 5 is applied, the sealing diaphragm 18 rises slightly while remaining in contact with the flat bottom 30 of the seal 29.

Therefore, even if the sealing diaphragm 18 were to be damaged, the liquid under pressure in the inlet line 5 could not leak and fill the chamber of the gas cushion 27.

This particular point is of significance inasmuch as if the gas cushion 27 were to become filled with liquid, the sealing diaphragm 18 would become hydraulically locked against the embossment 9, and the slide valve 4 would cease to operate. Thus, an irreversible bulging of the cylinder 1 following a blow of the top bed applied to the cap 3 could not be prevented.

The gas cushion 27 may be refilled in the shop by feeding the gas under pressure through the drilled passage 32. As the gas is under high pressure, it loosens the peripheral lip 31 to allow the gas to enter the bore 19a. When the incoming flow of gas through the passage 32 is stopped, the peripheral lip 31 of the seal 29 seals off the passage 32.

The embodiment illustrated in FIG. 7 is similar to that of FIG. 6, but illustrates adjustment devices which have been provided on the solid tight bottom 28 of the rigid envelope 19, thus allowing the pressure which actuates the sealing diaphragm 18 to be set in the shop.

A push-screw 33 is threaded through the solid tight bottom 28 for contacting an adjusting piston 34 inside the recess housing the gas cushion 27. The front face of the adjusting piston 34 is covered by a soft seal 35 made of rubber or a similar resilient material.

After the adjustment, the rear end of the push-screw 33 may be sealed with a cap 36 which may be affixed to the rigid envelope 19 using any suitable sealing procedure.

The disclosed slide valve assembly may be easily removed or mounted on the cylinder 1 by a simple operation. As the slide valve 4 is shop assembled, it remains adjustable by means of the push-screw 33, as shown in FIG. 7, and may be sealed thereafter by installing the cap 36.

After the slide valve 4 is mounted on the cylinder 1, no further adjustment is required, which makes its application particularly desirable in mines. The outlet line 8 is located at the center of the embossment 9, which is centrally located in the annular recess 10. The surface area against which the pressure in the cylinder 1 is applied is very large as compared to the area of the seal seat, and provides increased sensitivity and greater accuracy of the valve operation.

Having thus described the present invention, it will be apparent to those skilled in the art that various modifications may be made without departing from the spirit thereof or the scope of the claims appended hereto.

What is claimed is:

1. A hydraulic slide valve for a cylinder of a mine prop comprising:

valve body means having a valve housing receiving surface, a recess with a recess surface, first passage means communicating with said recess through said recess surface, hub means upstanding a hub height above said recess surface along a central axis, said hub means having an annular seating surface at said hub height and second passage means therethrough, said first passage means adapted to communicate with a source of fluid pressure and said second passage means adapted to communicate with a fluid drain means;

valve housing means having a bottom end and a valve body end, said valve body end comprising a valve body receiving surface secured to said valve housing receiving surface of said valve body means, said valve housing means further comprising a stepped diaphragm bore and a piston bore, said stepped diaphragm bore having an internal seating shoulder and defining a diaphragm chamber facing said recess, and said piston bore being axially disposed between said internal seating shoulder and said bottom end and defining a piston chamber radially inboard of said stepped diaphragm bore;

resilient circular diaphragm means having a piston side, a sealing side, and an outer rim portion secured in said diaphragm chamber against said internal seating shoulder;

piston means slidably received in said piston bore for axially engaging said piston side of said resilient circulr diaphragm means;

spring means disposed between said bottom end and said piston means urging said piston means against said piston side of said resilient circular diaphragm means to bias said sealing side of said resilient circular diaphragm means to normally seat against said annular seating surface of said valve body means of said hub means and thereby close said second passage means from said said recess, whereby said second passage means are sealed until said fluid pressure communicated to said first passage means exceeds a predetermined fluid pressure and to allow said fluid pressure when in excess of said predetermined fluid pressure to urge said sealing side of said resilient circular diaphragm means away from said annular seating surface to thereby open said second passage means and communicate said recess and said first passage means with said fluid drain means until said fluid pressure is reduced below said predetermined fluid pressure;

outer washer means disposed in said recess comprising an outer member secured to a resilient inner sealing member, said outer member securing said outer rim portion of said resilient circular diaphragm means against said internal seating shoulder and said resilient inner sealing member haaving a first and a second sealing lip with an axial separation therebetween, said first sealing lip continually sealingly engaging said recess surface of said recess and said second sealing lip continually sealingly engaging said sealing side of said resilient circular diaphragm means, whereby said first and said second sealing lips cooperate with said recess surface and said resilient circular diaphragm means to seal said first passage means from said valve housing receiving surface and said valve body receiving surface; and inner washer means having an upper and a lower surface disposed in said recess radially inboard of said outer washer means, said lower surface facing said recess surface and having embossment means protruding from said lower surface against said recess surface to space said recess surface axially from said lower surface and to thereby allow said first passage means to communicate with said recess, said inner and outer washer means cooperating with said annular seating surface to normally support substantially the entire said sealing side of said resilient circular diaphragm means at a washer height above said recess substantially the same as said hub height.

2. The hydraulic slide valve for a cylinder of a mine prop in accordance with claim 1 wherein said spring means comprises a helical spring means.

3. The hydraulic slide valve for a cylinder of a mine prop according to claim 1 wherein said bottom end of said valve housing means comprises a bottom member axially adjustable along said central axis to adjust said predetermined fluid pressure.

4. The hydraulic slide valve for a cylinder of a mine prop in accordance with claim 1 wherein said piston means comprises a cup-shaped member having radially resilient cylindrical sides slidably received in said piston bore.

5. The hydraulic slide valve for a cylinder of a mine prop in accordance with claim 4 wherein said spring means comprises compressed gas under a gas pressure and wherein said cup-shaped member seals said piston bore from said diaphragm chamber.

6. The hydraulic slide valve for a cylinder of a mine prop in accordance with claim 5 wherein said bottom end of said valve housing comprises a bottom member axially adjustable along said central axis to adjust said predetermined fluid pressure.

7. The hydraulic slide valve for a cylinder of a mine prop in accordance with claim 5 wherein said valve housing means comprises third passage means adapted to communicate a source of said compressed gas under said gas pressure with said piston bore and wherein said resilient cylindrical sides of said piston means normally seal said third passage means from said piston bore when said gas pressure is less than a predetermined gas pressure and when said gas pressure exceeds said predetermined gas pressure said resilient cylindrical sides deflect radially into said piston bore to allow said source of compressed gas to communicate with said piston bore.

8. The hydraulic slide valve for a cylinder of a mine prop in accordance with claim 6, wherein said valve housing means comprises seal cup means sealingly enclosing said bottom member to prevent said compressed gas from escaping therepast.

9. The hydraulic slide valve for a cylinder of a mine prop in accordance with claim 1 wherein said spring means comprises a spring washer means.

10. The hydralic slide valve for a cylinder of a mine prop in accordance with claim 1 wherein said spring means comprises a compressed gas means.

* * * * *